United States Patent [19]
Snyder et al.

[11] Patent Number: 6,132,204
[45] Date of Patent: Oct. 17, 2000

[54] WIDE FLAME BURNER

[75] Inventors: William Joseph Snyder, Ossining;
Arthur Wellington Francis, Jr.,
Monroe, both of N.Y.

[73] Assignee: Praxair Technology, Inc., Danbury, Conn.

[21] Appl. No.: 09/106,771

[22] Filed: Jun. 30, 1998

[51] Int. Cl.[7] .................................................. F23C 5/00
[52] U.S. Cl. ................................ 431/174; 8/10; 8/180; 239/549; 239/556; 239/557
[58] Field of Search ............................ 431/8, 9, 174, 431/180, 187, 353, 10, 189, 350, 354; 239/556, 557, 418, 549

[56] References Cited

U.S. PATENT DOCUMENTS

| | | | |
|---|---|---|---|
| 4,878,829 | 11/1989 | Anderson | 431/8 |
| 4,907,961 | 3/1990 | Anderson | 431/8 |
| 5,076,779 | 12/1991 | Kobayashi | 431/5 |
| 5,299,929 | 4/1994 | Yap | 431/8 |
| 5,302,112 | 4/1994 | Nabors, Jr. et al. | 431/8 |
| 5,611,682 | 3/1997 | Slavejkou et al. | 431/8 |
| 5,833,447 | 11/1998 | Bodelin et al. | 431/8 |

FOREIGN PATENT DOCUMENTS

0754912  1/1997  European Pat. Off. .

*Primary Examiner*—James C. Yeung
*Attorney, Agent, or Firm*—Donald T. Black

[57] ABSTRACT

A nozzle assembly, a burner and a method for producing a wide combustion flame are provided. The burner has a plurality of refractory nozzles, each having a minimum wall thickness of from about 0.25 to about 0.33 of the minimum nozzle dimension. Each nozzle has a plurality of orifices to enable the gas to be projected in a parallel plane with the gas projected in a plane from the other nozzle.

9 Claims, 5 Drawing Sheets

WIDE FLAME BURNER

FIELD OF THE INVENTION

This invention relates to a method and system for combusting materials, and more particularly for carrying out combustion with a wide flame.

BACKGROUND OF THE INVENTION

A need had arisen in the oxy-fuel firing of glass furnaces to achieve greater coverage of the glass surface with a flame. One way of accomplishing this is to use a wide flame burner. This type of burner produces a flame in which the dimension through the horizontal axis is much greater than through the vertical axis at any cross-section along the axis of the flame.

Recently, other manufacturers have been successfully marketing the advantages of using wide flame burners in glass furnaces. However, commercialization of these burners has been problematical. Burner overheating, block erosion, nozzle plugging and poor flame shapes all had to be addressed. To overcome these problems with a simpler burner geometry, an effort was undertaken to find a better way of producing a flat flame from an oxy-fuel burner.

Several wide flame burners are available on the market and each uses various different techniques to generate flames. EP 754,912 A2 discloses the injection of converging fuel and oxygen streams at low velocities to produce a long wide flame from a burner.

U.S. Pat. No. 5,299,929 discloses a burner where multiple fuel orifices in a fan shaped pattern are used to distribute the fuel in a wide fan-shaped flame. This fuel is sandwiched between two closely spaced oxygen passages above and below with baffles that force the oxygen to follow a fan shaped path as it exits the burner.

U.S. Pat. No. 5,302,112 discloses a burner where a stream of low velocity fuel and oxygen are purposely collided together along a vertical axis. When adjusted correctly, this produces a horizontal flat flame initiating at the point of collision in the furnace.

U.S. Pat. No. 5,611,682 discloses the use of an elongated opening to produce a wide or fan shaped flame for the burner described.

Various issues involving operation and maintenance problems are not adequately addressed in the art such as the capacity to operate for a prolonged period at high temperature and the avoidance of nozzle clogs, block erosion and poor flame shape. Accordingly, there is a need to solve these problems in the industry.

SUMMARY OF THE INVENTION

This invention is directed to a method for carrying out combustion with a wide flame comprising the steps of (a) providing a combustion zone containing an atmosphere of furnace gases at a temperature exceeding about 1000° F.; (b) injecting a wide oxidant layer through a first refractory nozzle having a plurality of first orifices at a velocity of less than about 180 ft/sec to produce an oxidant layer in the combustion zone; (c) injecting a wide fuel layer through a second refractory nozzle having a plurality of second orifices, the fuel being injected at a velocity of less than about 210 ft/sec to produce a fuel layer in a plane parallel to the oxidant layer in the combustion zone; (d) turbulently mixing at least a portion of the oxidant from the oxidant layer with at least a portion of the fuel from the fuel layer to produce an oxidant-fuel mixture in a mixture layer within the combustion zone; and (e) combusting fuel and oxidant within the mixture layer in the combustion zone to produce a wide flame.

In an alternative embodiment, this invention is also directed to a nozzle assembly for separate injection of a wide oxidant layer and a wide fuel layer into a combustion zone comprising (a) a first refractory nozzle having a minimum wall thickness of from about 0.25 to about 0.33 of the minimum nozzle dimension, the nozzle comprising a plurality of first orifices, the first orifices defining a first plane; (b) a second refractory nozzle having a minimum wall thickness of from about 0.25 to about 0.33 of the minimum nozzle dimension, the nozzle comprising a plurality of second orifices, the second orifices defining a second plane that is parallel to the first plane; (c) a first conduit means in fluid communication with each of the first orifices for passing oxidant from an oxidant source to the first orifices; and (d) a second conduit means in fluid communication with each of the second orifices for passing fuel from a fuel source to the second orifices; wherein each of the first orifices is vertically aligned with a corresponding second orifice.

In yet another alternative embodiment, this invention is directed to a burner for producing a wide combustion flame comprising (a) a first refractory nozzle having a minimum wall thickness of from about 0.25 to about 0.33 of the minimum nozzle dimension and comprising a plurality of first orifices; (b) a second refractory nozzle having a minimum wall thickness of from about 0.25 to about 0.33 of the minimum nozzle dimension and comprising a plurality of second orifices, the number of first orifices being the same as the number of second orifices; (c) a refractory material placed between each of the first and second refractory nozzle; (d) the first and second nozzle removably mounted on a refractory burner block such that each of the first orifices is vertically aligned with a corresponding second orifices; (e) a first conduit means in fluid communication with each of the first orifices for passing oxidant from an oxidant source to the first orifices; and (f) a second conduit means in fluid communication with each of the second orifices for passing fuel from a fuel source to the second orifices wherein each of the second orifices is vertically aligned and at the same angle with a corresponding first orifice.

The first refractory nozzle may be located above or below the second refractory nozzle. The number of orifices in the first nozzle is preferably the same as the number of orifices in the second nozzle. The oxidant is a fluid having an oxygen concentration of at least 30 percent by volume. Preferably, pure oxygen is used as an oxidant. The fuel preferably comprises a gaseous fuel, including natural gas, and other combustible gases known in the art such as hydrogen, propane and liquified petroleum gas.

Either the oxidant and/or the fuel may be externally preheated prior to injecting into the combustion zone.

The first and second refractory nozzle of the assembly have a minimum wall thickness of less than 1.5" and each of the orifices diverges with an adjacent orifice in the nozzle at an angle between 0 and 45 degrees. Each of the nozzles is a replaceable unit and may be parallel to one another. Each refractory nozzle may be recessed by the same distance with respect to the burner block. Preferably, a refractory material is placed between the first and second refractory nozzle to prevent any unexpected mixing of the oxidant and fuel in the burner block.

As used herein, the term "combustible zone" means a volume in which fuel and oxidant mix and react to release heat.

As used herein, the term "pure oxygen" means a gas having an oxygen concentration of at least 99.5 percent.

As used herein, the term "gaseous fuel" means a fuel composed of one or more gaseous components, some of which are combustible, liquid fuel droplets dispersed in a gaseous medium; solid fuel particles dispersed in a gaseous medium.

As used herein, the term "wide" in the context of wide flame means the flame exhibits an aspect ratio greater than 2 (i.e. the width of the flame's major axis is two or more times longer than the height of the flames minor axis) at any cross-section along the axis of the flame.

As used herein, the term "refractory" in the context of "refractory block" means any of a series of materials which can withstand temperatures greater than 220° F. (1204° C.) and which usually comprise of oxides, nitrides or carbides of other metallic elements. Examples are silica, fused silica, bonded alumina-zirconia-silica, alumina, mullite, silicon carbide, silicon nitride and boron nitride. For the purpose of this invention, the preferred refractory material is an alumina-zirconia-silica refractory containing about 66% alumina, 21% zirconia and 12% silica.

BRIEF DESCRIPTION OF THE DRAWINGS

FIG. 1b is a side elevation view of the nozzle illustrated in FIG. 1a.

FIG. 1c is a head-on view of the nozzle illustrated in FIG. 1a.

FIG. 2c is a side elevation view of the burners illustrated in FIG. 2a.

FIG. 2d is a head-on view of the burner illustrated in FIG. 2a from the gas outlet end.

DETAILED DESCRIPTION

To produce a wide flame in this invention, multiple conical fuel and oxidant jets are issued from two separate nozzles in a fan shaped pattern. This allows fairly precise control over the distribution of fuel throughout the flame and its overall shape (i.e. width). The nozzle is located close to the inside (hot) surface of the furnace wall so that the angle of the fuel and oxidant jets can be manipulated to any desired angle without being restricted by the confines of a narrow burner block.

Because of the high temperatures at this location in the furnace, the burner nozzles are preferably made from a refractory material. This eliminates the need for water cooling and allows no metal parts to be placed near the hot surface of the furnace wall. The nozzle must be fairly rugged to handle the potential for thermal and mechanical shock and hence has a fairly thick cross-section. To avoid excessive temperatures produced when oxidant and fuel mix and burn, the two reactant streams are injected separately through two similar nozzles and mix within the furnace once they are some distance from the nozzles.

By injecting the gases separately, as stated above, the NOx generated by this burner is about half that generated by any burner where all the oxidant and fuel are in direct contact within or immediately infront of a burner block. The vertical spacing between the nozzles will influence flame length and NOx levels and can be chosen ahead of time by design.

To avoid operating and maintenance problems, a simple mechanical design of the burner is proposed. The simplicity also makes the burner a low cost item should it need replacement. The velocities for the burner are kept low (between 50 and 210 ft/sec) to minimize entrainment of corrosive and condensable furnace gases against the nozzle. The orifices in the nozzle are also kept relatively large to enable the nozzle to operate at a high temperature and avoid condensation of volatiles in the atmosphere that could clog the nozzle. By using refractories for critical burner parts, the burner is also amenable to use with preheated feedstocks such as preheated oxygen and preheated natural gas.

This invention will be described in detail with reference to the drawings.

Mechanical Design

Figure 1A:
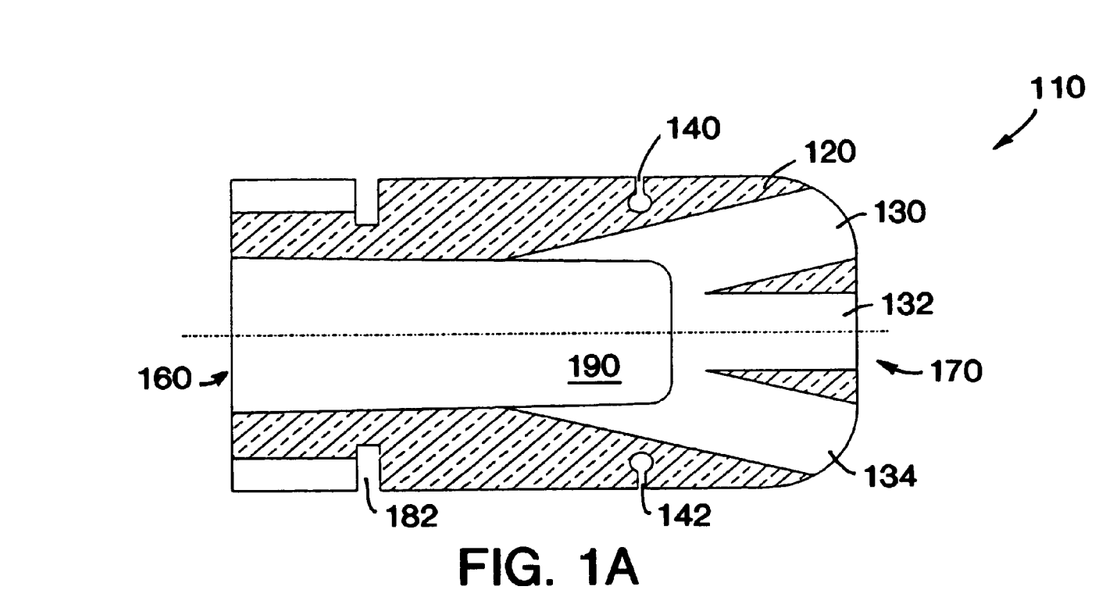
FIG. 1a is a top plan view of one embodiment of the nozzle of this invention.
Figure 1B:
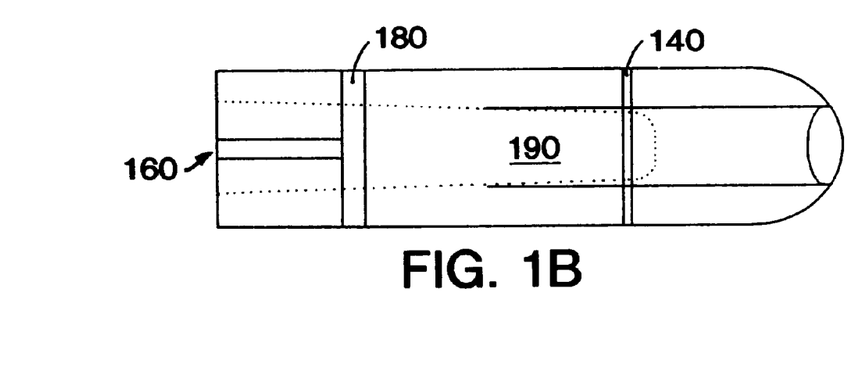
Figure 1C:
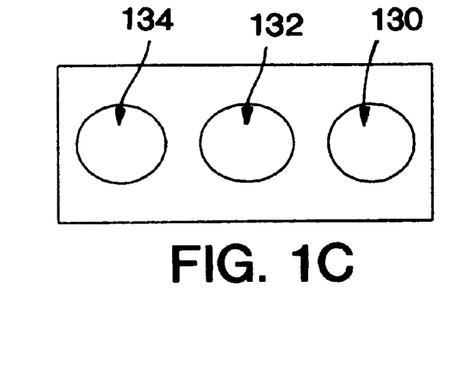
Figure 2A:
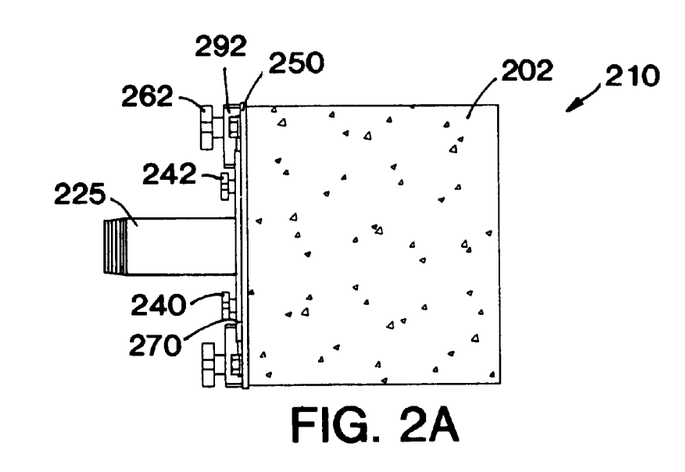
FIG. 2a is a top plan view of a burner of this invention having both a nozzle for the oxidant and the fuel.
Figure 2B:
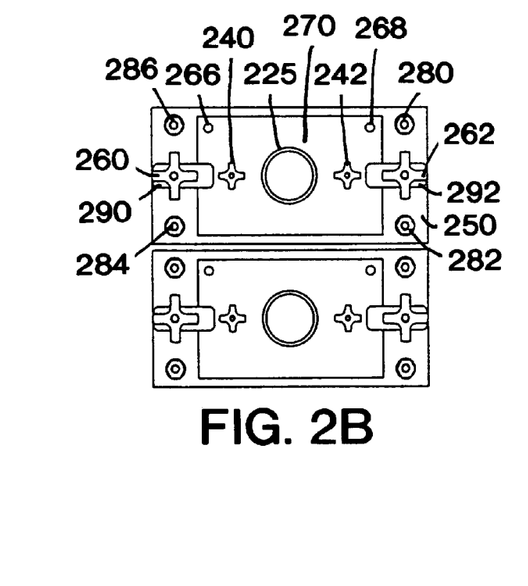
FIG. 2b is a head-on view of the burner illustrated in FIG. 2a from the gas inlet end.
Figures 2C, 2D:
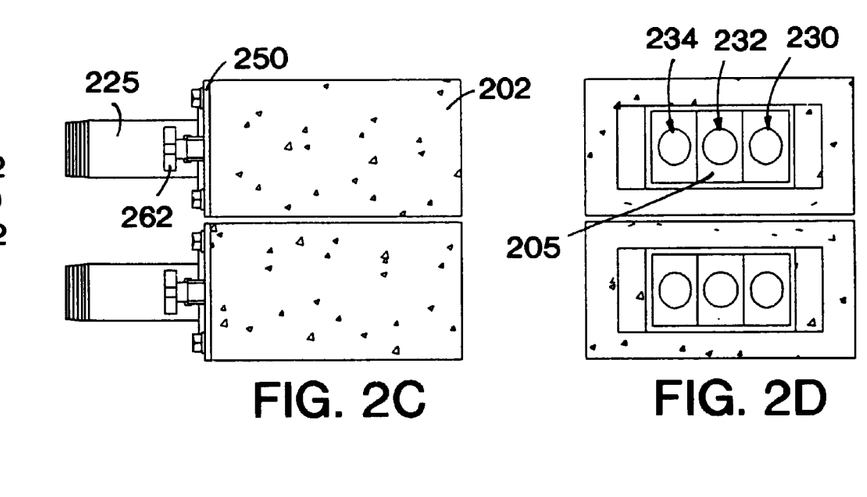

FIGS. 1a, 1b and 1c are sketches of the refractory nozzle. This is the heart of the invention in its simplicity and functionality. The nozzle 110 consists of a refractory brick 120 with three orifices 130, 132 and 134 drilled or cast in the front face 170 to allow gas to pass into the furnace. These three orifices pass into a central larger passage 190 which brings the gas from the inlet end (back face) 160 of the burner to the outlet end (front face) 170 of the burner. The cross-sectional area of this passage is greater than 85% of the area of the exit orifices in the face of the nozzle to insure a uniform distribution of gas to all the orifices. Two slots 180 and 182 are cut or cast in each side of the brick to allow mechanical fasteners to attach brick 120 to a metal mounting plate. Tapered plenum 190 is the conduit which distributes the fuel or oxidant to orifices 130, 132 and 134. Stress slits 140 and 142 are provided in refractory brick 120 to aid in relieving the tensile stress produced as a result of the varying temperature in the nozzle.

In FIG. 1c, where the horizontal length of the burner face along the three orifices may be designated as "L" and the vertical length of the burner face passing through one orifice may be designated as "H", the minimum nozzle dimension is the length of H provided H is less than L.

FIGS. 2a, 2b, 2c and 2d show the total burner configuration which consists of two separate burner blocks for the two nozzles comprising one burner. For simplicity, only one will be described (shown in FIG. 2d as nozzle 205, terminating in orifices 230, 232 and 234) as both blocks are similar in design. The separated blocks facilitate adjusting the vertical spacing of the nozzles. In an alternative embodiment, it should be noted that one unified block comprising the two nozzles, each having a plurality of orifices, is also contemplated.

The burner block 202 has a plate 250 mounted to the back of it to fasten the nozzles to and provide a sealing surface between the nozzle plate 270 and the burner block plate 250. This prevents cold air from leaking into the furnace around the nozzle and hot furnace gases from leaking out. To secure the burner block plate 250 to the burner block 202, bolt means 280, 282, 284 and 286 are used. The nozzle plate 270 has two small alignment holes 266 and 268 in the top edge through which two pins on the burner block plate 250 pass, so that the nozzle plate 270 can be accurately aligned with the burner block plate 250. This positions the nozzle 205 in burner 210 in the center of the opening in the burner block. The two small hand knobs 240 and 242 on either side of the inlet pipe 225 fasten the nozzle plate 270 to the refractory nozzle 205. In this way, a defective, worn or broken nozzle can be exchanged and replaced with a new one and still utilize the same metallic components. The nozzle plate 270 is fastened to burner block plate 250 via two larger hand knobs 260 and 262 and two swivel clamps 290 and 292. This allows the nozzle 205 to be inserted and removed without having to remove any fastening devices from the burner block plate 250. This makes maintaining and servicing the burner fairly easy and straight forward.

Figure 3:
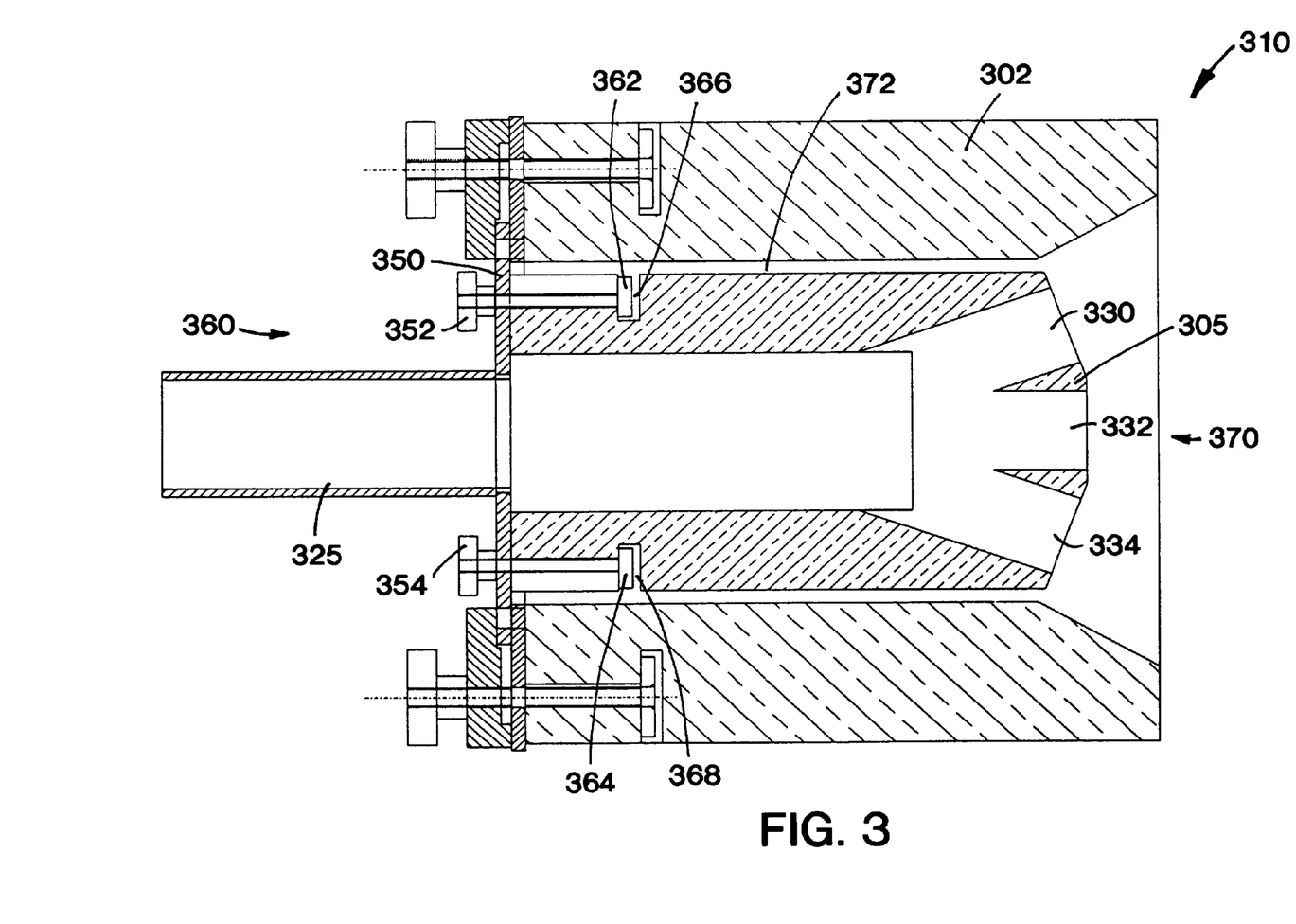
FIG. 3 is a cut away view of the burner through the nozzle encompassing an alternative embodiment of the nozzle of FIG. 1.

A top cut-away view of the burner 310 is shown in FIG. 3. The nozzle 305 is centered in the opening of the burner block 302 and is shown recessed from the front end 370 of the burner block. The nozzle shown is an alternative embodiment of the nozzle shown in FIG. 1 in that the front face of the nozzle has two mitered cuts which are perpendicular to the drilled orifices 334 and 330, rather than a rounded end. The openings at the front of the burner block 302 are tapered to avoid the angled jets of the nozzle from impinging on the edges of the block.

The orifices 330, 332 and 334 in nozzle 305 can be drilled at any diameter and angle from the nozzle axis to vary the wide flame characteristics emanating from the burner.

The nozzle 305 is secured to the nozzle mounting plate 350 via two T-bolts 362, 364, which are inserted into slots 366, 368 on the rear end 360 of the nozzle 305. Two hand knobs 352, 354 are used to fasten these two parts together. A gasket (not shown) is placed between the nozzle 305 and the nozzle mounting plate 350 to prevent gas from leaking at this joint. A gap 372 is provided between the nozzle and burner block so that in the event of a gas leak, the gas would be directed harmlessly to the front of the burner block 370. Inlet piping from a fuel or oxidant supply can be connected to the inlet connection 325 as in any standard plumbing fashion.

Several advantages are realized by using refractory for primary burner parts. First, the burner can remain in the furnace through any down period with no additional cooling requirements. Typically, metallic burners must be removed or air cooled when the gas and oxidant flows to them are shutoff to avoid damaging/overheating the metal burner parts. Secondly, the higher surface temperatures of the burner components will prevent condensation of volatiles from the combustion atmosphere, which is a major problem in glass making furnaces causing plugging of orifices and frequent maintenance. Thirdly, refractory burner parts are compatible with preheated fuel and/or oxidant supplies in that no overheating of already thermally stressed metallic parts will occur. Lastly, without nozzle temperature concerns, the tip of the burner can be closer to the inside of the furnace thereby increasing the flexibility of the burner by allowing a variety of different nozzle drilling patterns to be employed. Each different pattern could result in a different flame shape and heat delivery profile for the burner. This is not practical with metallic burners because they usually require a deep, narrow burner block to protect the burner from the radiant heat of the furnace so there is little flexibility available for gas flow direction. Refractory burner components do have a disadvantage in that they are susceptible to thermal shock, poor tensile strength, and difficulty to machine.

To overcome the thermal shock problems, heavy walled nozzles of thermally shock resistant materials are used. Typically, the wall thickness is 0.25 of the minimum nozzle dimension (i.e. for a 3"×6" nozzle, the minimum wall thickness will be 0.25*3"=0.75") or 1.5", whichever is less. To maximize the wall thickness around the main cavity down the center of the nozzle, an oval shaped hole is provided in the nozzle's rectangular cross-section. These heavier sections will be better able to resist cracking than thin walled sections, and will be better able to resist nozzle rupture should cracks develop.

The poor tensile strength of the refractory material is addressed by designing the nozzle such that all parts of the nozzle experiencing tensile stresses are in the colder regions of the burner and by limiting the internal pressure of the gas (by using low velocities) so as not to exacerbate the stress condition in the nozzle. As noted in FIG. 1, stress slits 140 and 142 are provided on the sides of the refractory brick toward the front face. These slits aid to relieve the stress as a result of the varying temperature in the nozzle.

The machining issue is overcome by utilizing fairly simple shapes which can be directly cast to their final shape, or partially cast to an intermediate shape and then, using simple drilling techniques, customized for its particular function.

Because refractory has a low thermal conductivity, when fuel and oxidant meet at its surface and burn, a very high temperature region results because the refractory cannot transfer the heat of reaction away from the surface quickly enough. To avoid this potential overheating problem, the fuel and oxidant are injected separately through two nozzles so there is little to no reaction at the surface of the nozzle to create overheating. All the combustion occurs in the furnace thereby allowing the refractory nozzle to remain at reasonable temperatures. In the event of nozzle failure (i.e. cracks, breakage, etc.) the fuel or oxidant will flow out of the nozzle and be contained by the burner block to produce a poorly defined flame without damaging or overheating the burner block or nozzles.

To prevent the nozzle from becoming "glued" into the burner block because of frozen glass, some design features were included. First, the nozzle is recessed in the burner block by about one inch and the burner block is recessed in the furnace wall by about one inch. This prevents any rundown on the inside wall of the furnace from filling the gap between the nozzle and the burner block and gluing the two pieces together. To avoid condensables from collecting in colder regions of the burner, a 0.25" gap is provided between the block and the nozzle. This is large enough to prevent bridging of any condensables between the two surfaces. The low velocities employed with this burner minimize furnace gases from being recirculated near the nozzle and contributing to corrosion or condensation.

Process Design

Flames for use in glass furnaces need the following attributes to be acceptable to the user: high luminosity, low momentum, high aspect ratio (width of flame versus height of flame), no lofting (upward bending of flame due to buoyancy), stability, no smoke generation, low NOx and carbon monoxide emissions. To achieve many of these attributes, lower velocity burner systems are employed. Lower velocity jets behave differently than higher velocity jets because buoyancy becomes a larger component of the force balance on the free jet system, and the larger diameter holes prevalent in low velocity systems delay jet mixing. The use of multiple jets also allows more flexibility in flame shaping from a single burner.

The horizontal placement of the jets provides one parameter which can be manipulated to create different jet and hence flame effects in the furnace. The turbulent nature of a gas jet injected into a medium creates entrainment of surrounding fluid into the jets and results in the expansion of the jet and a dissipation of its velocity. A jet will entrain gases from all sides as it expands and if sufficient gas is not available, it will recirculate its own gases from a point further downstream back to the root of the jet to supply the entrainment requirement. When a jet is close to another jet of the same gas, there is a limited amount of gas between the two jets to satisfy the entrainment requirement because both jets are trying to draw from the same gas reservoir, so each jet begins to recirculate its own gases along that side. This creates a region between the two jets with a concentration of gas similar to that of the original gas jets, but at a slightly lower level due to some dilution by surrounding gases. Hence, by placing multiple jets close together in the same plane, a layer of jet gas can be created between the jets with the maximum concentration of jet fluid occurring along the axis of each individual jet in the grouping.

Fuel jets spaced closely will form a fuel-rich layer whose size will be defined by the initial jet angles. Similarly, oxidant jets will produce an oxidant-rich layer. When the fuel and oxidant layers are injected into the same enclosure, the fuel and oxidant layers, due to turbulence and jet entrainment will mix with each other and begin reacting, forming a wide flame region defined by the initial jet angles of the two reactants. As long as the distance of the fuel jets to each other and oxidant jets to each other is greater than the distance of the oxidant jets to the fuel jets, a wide flame can be created as opposed to multiple small flames at each fuel/oxygen jet pair.

Figure 4:
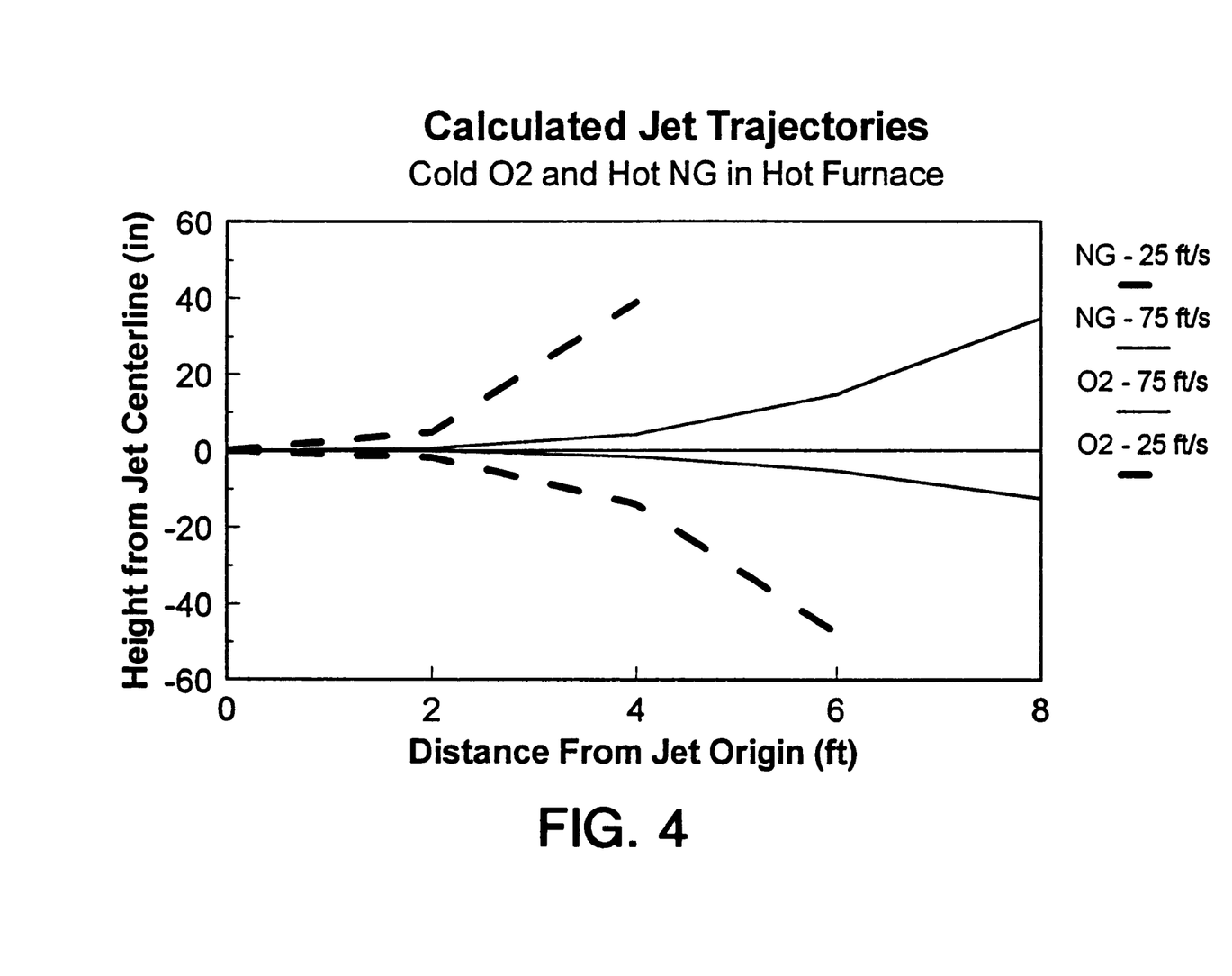
FIG. 4 is a plot of the calculated jet trajectories of the height from the jet centerline (in.) as a function of the distance from the jet origin (ft.) for the burner of this invention.

The vertical position of the oxygen and fuel can also affect the mixing rate and hence the appearance of the flame. This has to do with the buoyancy effect. FIG. 4 shows the jet buoyancy effects of the gas stream. For example, the natural gas fuel has a rising buoyancy effect, while the oxidant has a sinking effect. This important characteristic is used to optimize the calculated jet trajectories for combustion in the combustion zone.

In low velocity systems, buoyancy can impact the rate at which turbulent mixing occurs. Oxidant jets are typically cold and denser than the fuel jets, so when injected into a furnace they usually fall down towards the bottom of the furnace. On the other hand, most gaseous fuels are less dense than the oxidant (i.e., pure oxygen) and once they start burning become hotter than the surroundings so they tend to rise in the furnace environment. If the oxidant layer is placed below the fuel layer, the streams diverge, and the rate of mixing between the streams is reduced. On the other hand, if the oxidant is placed above the fuel, the two streams converge due to buoyancy and the mixing is enhanced. Placing the oxidant stream over the fuel stream controls lofting because the cooler oxidant prevents the warmer fuel from rising as it progresses along the flame length. This vertical positioning of oxidant and fuel can be used to alter flame lengths and NOx emissions from the burner.

Figure 5:
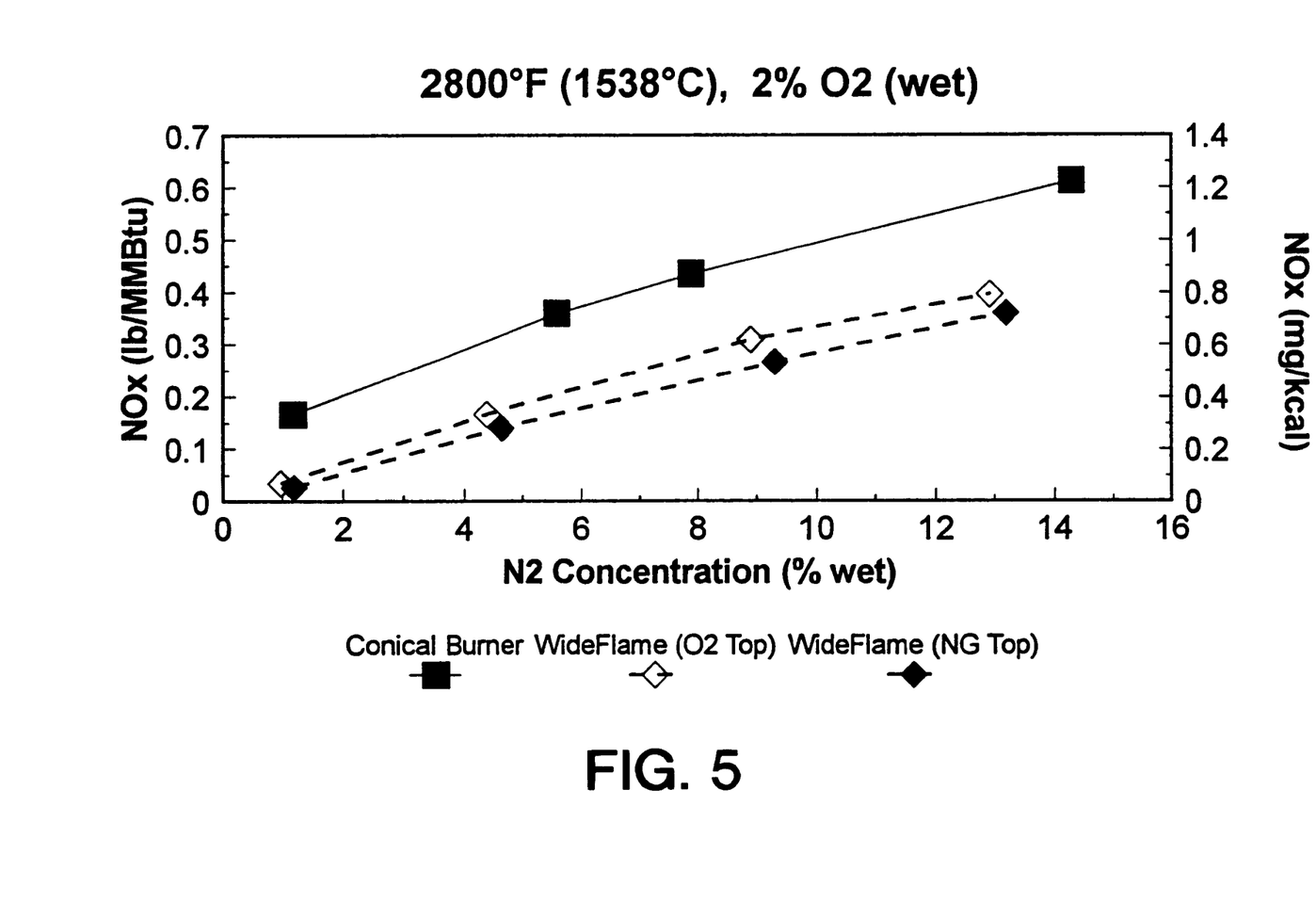
FIG. 5 is a plot of the relationship of the NOx emission (lbm/MMBtu) as a function of the furnace $N_2$ level (% wet) for the burner of this invention and a standard burner design.

FIG. 5 shows the NOx level produced by the wide flame burner of this invention. Due to separate injection of fuel and oxidant, delayed mixing and greater flame surface areas, the NOx emission from the wide flame burner is about 50% lower than that of a conventional concentric tube oxy-fuel burner. The figure also shows the impact of switching the vertical position of the fuel and oxidant. With the oxidant on top, mixing is enhanced due to the buoyancy effect and the flame is shorter and higher temperature which produces slightly higher NOx levels. With the oxidant on the bottom, mixing is delayed and the longer flame runs a little cooler and produces slightly less NOx.

To produce luminous flames and avoid nozzle plugging/corrosion issues, a preselected velocity is used to create a different combustion process. A turndown test revealed that the burner could be operated between 70 and 210 ft/sec for the natural gas stream and 50 and 180 ft/sec for the oxygen stream while still maintaining a productive flame. At the low end of the velocity range, the flame is luminous and exhibits some lofting behavior. At the higher end of the velocity range, the luminosity is lower and the flame appears less stable than at lower velocities.

Experimentation has shown that the shape of the flame may be modified via different nozzle drillings.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A nozzle assembly for separate injection of a wide oxidant layer and a wide fuel layer into a combustion zone comprising:
    (a) a first refractory nozzle comprising a central passage and a plurality of first orifices communicating with said passage, the nozzle having a minimum wall thickness measured from said central passage to the external surface of the nozzle in the direction of the minimum nozzle dimension of from about 0.25 to about 0.33 of the minimum nozzle dimension, the first orifices defining a first plane, wherein said minimum nozzle dimension is the vertical length of the assembly passing through one orifice, provided that said vertical length is shorter than the horizontal length of the assembly face along the orifice;
    (b) a second refractory nozzle comprising a central passage and a plurality of second orifices communicating with said passage, the nozzle having a minimum wall thickness measured from said central passage to the external surface of the nozzle in the direction of the minimum nozzle dimension of from about 0.25 to about 0.33 of the minimum nozzle dimension, the second orifices defining a second plane that is parallel to the first plane, wherein said minimum nozzle dimension is the vertical length of the assembly passing through one orifice, provided that said vertical length is shorter than the horizontal length of the assembly face along the orifice;
    (c) a first conduit means in fluid communication with each of the first orifices for passing oxidant from an oxidant source to the first orifices; and
    (d) a second conduit means in fluid communication with each of the second orifices for passing fuel from a fuel source to the second orifices; wherein each of the first orifices is vertically aligned with a corresponding second orifice.

2. The nozzle assembly of claim 1 wherein each of the first and second refractory nozzles has a minimum wall thickness of less than 1.5".

3. The nozzle assembly of claim 1 wherein the first refractory nozzle is located below the second refractory nozzle.

4. The nozzle assembly of claim 1 wherein each of the first orifices diverges with respect to an adjacent first orifice in the first nozzle at an angle between 0 and 45 degrees.

5. The nozzle assembly of claim 1 wherein each of the second orifices diverges with respect to an adjacent second orifice in the second nozzle at an angle between 0 and 45 degrees.

6. The nozzle assembly of claim 1 which forms a burner wherein each of the second orifices is vertically aligned and at the same angle with a corresponding first orifice.

7. A burner for producing a wide combustion flame comprising:

(a) a first refractory nozzle comprising a central passage and a plurality of first orifices communicating with said passage, the nozzle having a minimum wall thickness measured from said central passage to the external surface of the nozzle in the direction of the minimum nozzle dimension of from about 0.25 to about 0.33 of the minimum nozzle dimension the first orifices defining a first plane, wherein said minimum nozzle dimension is the vertical length of the burner passing trough one orifice, provided that said vertical length is shorter than the horizontal length of the burner face along the orifice;

(b) a second refractory nozzle comprising a central passage and a plurality of second orifices communicating with said passage, the nozzle having a minimum wall thickness measured from said central passage to the external surface of the nozzle in the direction of the minimum nozzle dimension of from about 0.25 to about 0.33 of the minimum nozzle dimension the number of first orifices being the same as the number of second orifices, the second orifices defining a second plane that is parallel to the first plane, wherein said minimum nozzle dimension is the vertical length of the assembly passing through one orifice, provided that said vertical length is shorter than the horizontal length of the assembly face along the orifice;

(c) the first and second nozzles removably mounted in a refractory burner block such that each of the first orifices is vertically aligned with a corresponding second orifice and such that refractory burner block material is between each of said first and second refractory nozzle;

(d) a first conduit means in fluid communication with each of the first orifices for passing oxidant from an oxidant source to the first orifices; and (e) a second conduit means in fluid communication with each of the second orifices wherein each of the second orifices is vertically aligned and at the same angle with a corresponding first orifice.

8. The burner of claim 7 wherein the first set of orifices and the second set of orifices are parallel to each other.

9. The burner of claim 7 wherein both the first refractory nozzle and the second refractory nozzle are recessed by the same distance with respect to the burner block.

* * * * *